United States Patent

Corrado

[15] 3,699,787
[45] Oct. 24, 1972

[54] COVER MEANS FOR NAVIGATIONAL INSTRUMENTS AND RADIO EQUIPMENT MOUNTED ON PANEL OF AIRCRAFT

[72] Inventor: Ronald F. Corrado, 727 Noriegn Way, Pacifica, Calif. 94044

[22] Filed: Dec. 14, 1970

[21] Appl. No.: 97,708

[52] U.S. Cl. ................... 70/58, 70/167, 70/DIG. 34
[51] Int. Cl. ......................................... E05d 73/00
[58] Field of Search ................ 70/57–58, 163–164, 70/166–169, 229,230, 232, 258–259, DIG. 34; 161/93, 98, 19 L

[56] References Cited

UNITED STATES PATENTS

| | | | |
|---|---|---|---|
| 3,415,086 | 12/1968 | Trainor | 70/240 |
| 3,506,526 | 4/1970 | Toyooka | 161/5 |
| 2,005,535 | 6/1935 | Duarte | 70/259 |
| 2,124,789 | 7/1938 | Lyon | 301/37 |
| 2,535,126 | 12/1950 | Flowers | 70/169 |

*Primary Examiner*—Robert L. Wolfe
*Attorney*—Stanley D. Schwartz

[57] ABSTRACT

A cover means for the navigational instruments and radio equipment of an aircraft that are mounted on and arranged for removal from the aft face of the instrument panel of such aircraft which cover means includes a cover provided with lock means that are arranged to coact with cooperating lock devices mounted on such aircraft instrument panel or other permanent structure of the aircraft so as to prevent removal of such cover from said panel and consequently access to the instruments and equipment mounted thereon and thereby preclude their unauthorized removal or theft.

16 Claims, 10 Drawing Figures

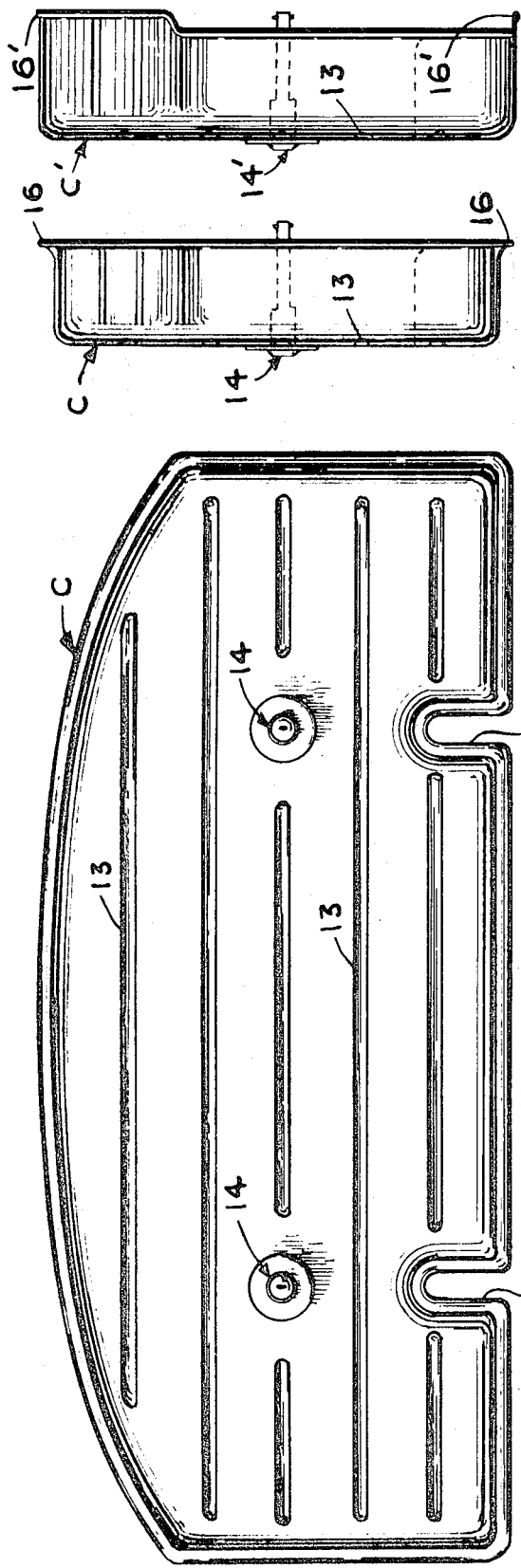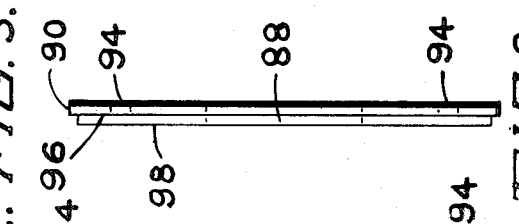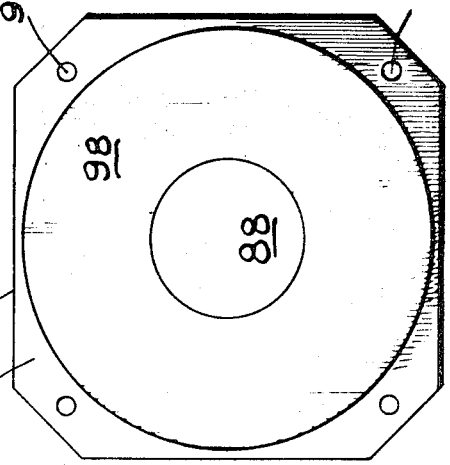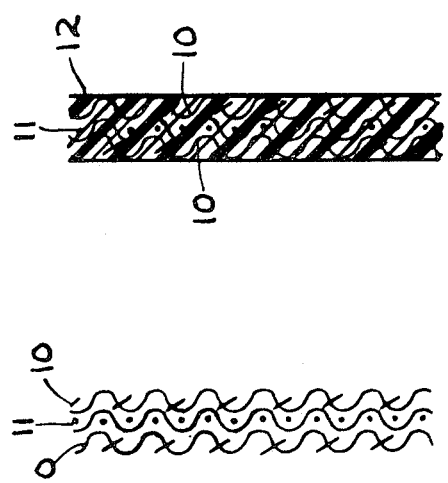

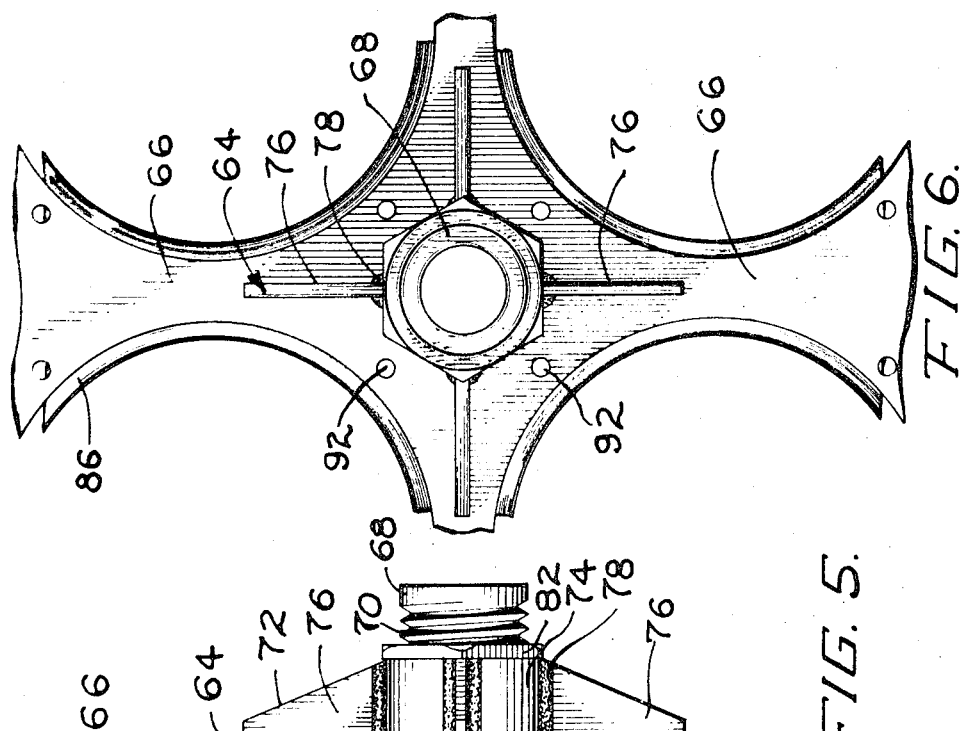
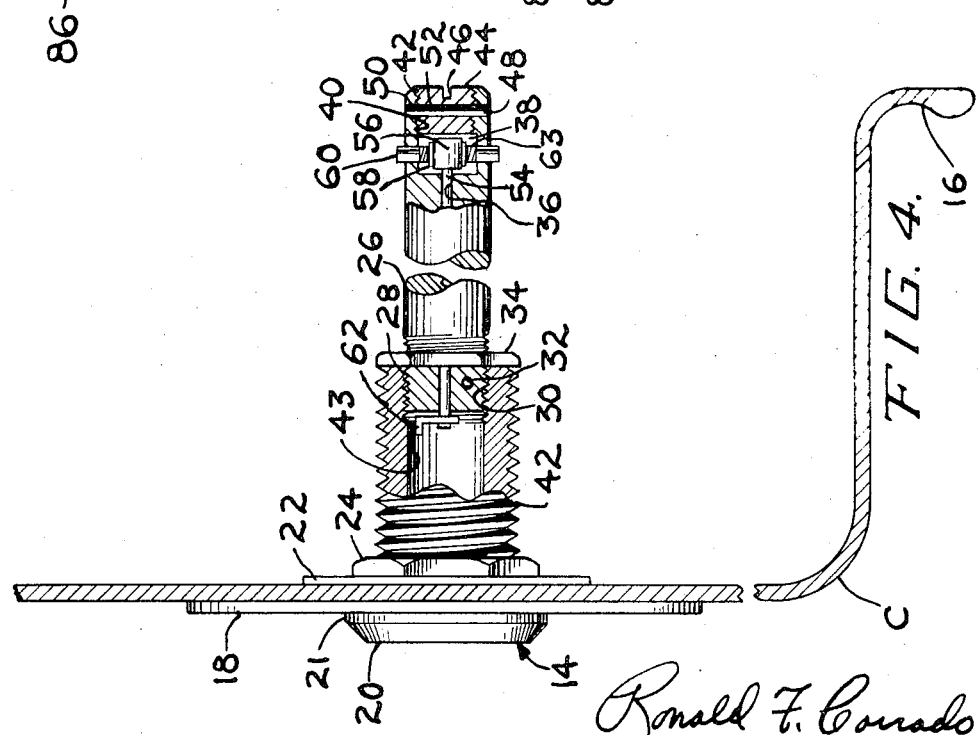

COVER MEANS FOR NAVIGATIONAL INSTRUMENTS AND RADIO EQUIPMENT MOUNTED ON PANEL OF AIRCRAFT

The present invention relates to small aircrafts and more particularly to a cover and lock means for the cover that protect the navigational instruments and radio equipment mounted on the instrument panel of such aircrafts from the unauthorized removal or removal and theft of such instruments or equipment.

In general, the navigational instruments and radio equipment are constructed for mounting so that they can be readily installed or removed for repair or replacement from the aft or front of the instrument panel. Furthermore, such small aircraft are not usually so constructed that the instrument panel thereof is contained within an enclosure which can be locked against the entry therein of unauthorized persons. Moreover, because of the costs involved in providing hangars that can be locked against the entry of unauthorized persons, such small aircraft are usually stored in the open spaced or private airfields or at remote isolated areas of public airports. Accordingly, the removal and theft of navigational instruments and/or radio equipment from such small aircraft has become a matter of major concern to the owners of such small aircraft. There thus remains a need for a simple, efficient and relatively inexpensive device to preclude the unauthorized removal or theft of such instruments and equipment from the panel of these small aircraft and the primary object hereof is to satisfy this need and additionally to provide such a device which, with little modification, has universal application.

More specifically, one of the primary objects of the present invention is to provide a cover means including a cover than can be readily applied to and removed from the aft or front of the panel of the aircraft on which its navigation instruments and radio equipment are mounted for removal in a direction that is aft or the aircraft.

A further object of the invention is to provide such a cover with a plurality of pin means that are arranged to be operated so as to coact with engageable means mounted on a panel, for example the instrument panel of the aircraft, to secure such cover in contact with the instrument panel of the aircraft.

A still further object of the invention is to provide a key operated locking assembly for each of said plurality of pin operating means.

A still further object of the invention is to produce a device according to the present teachings which is simple in construction, durable and made of readily available inexpensive materials.

The invention will be better understood and objects other than those set forth above will become apparent after reading the following detailed description thereof. Such description refers to the annexed drawings as presenting preferred and illustrative embodiments of the invention.

In the drawings:

FIG. 1 is a front elevation of a cover constructed in accordance with the present invention;

FIG. 2 is a side elevation of the cover illustrated in FIG. 1;

FIG. 3 is a side elevation of a slightly modified form of the cover illustrated in FIG. 1;

FIG. 4 is a partial sectional view of the cover of FIG. 1 taken longitudinally along the cover showing the key operated locking assembly partly in section and partly in elevation;

FIG. 5 is a sectional view through the instrument and trim panels of the aircraft showing in side elevation the lock receptacle mounted on the instrument panel and extending through an opening formed in the trim panel;

FIG. 6 is an end view showing the lock receptacle mounted on the instrument panel of the aircraft;

FIG. 7 is a front elevation of an instrument panel filler plate used to mount a lock receptacle;

FIG. 8 is an end view of the filler plate of FIG. 7;

FIG. 9 is a sectional view of a longitudinal extent of the material of which the cover is formed prior to its impregnation with a plastic resin;

FIG. 10 is a view similar to FIG. 9 but showing such longitudinal extent of material after its impregnation with a plastic resin.

DESCRIPTION OF THE PREFERRED EMBODIMENT

Referring now to the drawings it is to be noted that the device shown therein includes a main plastic elongated concave cover C which has a basic shape such as illustrated in FIG. 1, but in each instance is specifically designed for application to the particular type of instrument and equipment panel to which it is to be applied.

The cover C shown in FIG. 2 is formed of an inside and outside layers 10 of woven fiber glass mesh between which is located a screen 11 of hardened steel wire. These three layers of fiber glass mesh and steel wire screen 11 are impregnated with a matrix 12 of plastic resin. Cover C, as illustrated in FIG. 2, is provided with molded indentations which form strengthening ribs 13 that effect rigidity of the entire cover C. Cover C is further provided with cutouts 15, 15 that are properly spaced to receive the control columns of the aircraft. The top and bottom edges of the cover C are provided with circumferential flanges or lips 16 which fit within a recess in the instrument panel 66 of the aircraft when that type of panel is provided by the manufacturer of the aircraft. Such a construction tends to prevent or at least make more difficult attempted prying off of the cover C. In order to make cutting or sawing the cover even more difficult, the plastic matrix 12 in the immediate area of steel wire screen 11 will be only partially cured so as to load any cutting tool that may be used to attempt unauthorized removal of the cover C.

When a non-recessed instrument panel is provided by the manufacturer of the aircraft such non-recessed portion usually includes a protruding portion. A cover C' as shown in FIG. 3, somewhat similar to cover C of FIG. 2, is then employed. However, the cover C' is provided with forwardly extending lips 16' on its top and bottom that extend over the protruding portions of the aircraft panel. Such protruding portions of the cover C' prevent attempted prying off of the cover C' from the aircraft panel.

Each of the covers C and C' is provided with two or more identical key locking assemblies 14, 14', respectively. Since the key locking assemblies 14', 14' of cover C' are identical with those of cover C, a description of one of the key locking assemblies 14 of cover C is regarded as a sufficient description of all the other key locking assemblies.

Each key locking assembly 14 is mounted within an opening, not illustrated in the drawings, provided in the wall of cover C. Each key locking assembly 14 includes a lock tumbler housing 20 of hardened steel that has a radial flange portion 21 extending therefrom and an exteriorly threaded axially forwardly directed tubular projection 42.

A hardened steel washer 18 is mounted on the locking assembly 14 between the radial flange portion 21 of the tumbler housing 20 and the aft surface of cover C. A similar hardened steel washer 22 is mounted on the threaded forwardly directed tubular projection 42. A jam nut 24 is threaded onto the exterior of tubular projection 42 and advanced in an aft direction until it is in engagement with the forward face of hardened steel washer 22. Further advancing of jam nut 24 onto threaded tubular projection 42 causes the forward face of hardened steel washer 18 to be moved into tight engagement with the aft face of cover C by reason of the engagement of the forward face of radial flange 21 with the aft surface of hardened steel washer 18. At the same time the aft surface of hardened steel washer 22 is forced into tight engagement with the forward surface of cover C by jamnut 24.

A camshaft and locking pin housing 26, formed of an aluminum alloy, is provided with threads 28 on its exterior that engage with threads 30 formed on the hollow interior 43 of tumbler housing 20. The hollow interior 43 of the tumbler housing 20 may be made by the manufacturer to fit a variety of key tumbler devices. Unscrewing of the lock pin housing 26 from the tumbler housing 20 is prevented by a retaining pin 32 and a lock nut 34.

The lock pin housing 26 is provided with an axially extending bore 36 that terminates in a cam enclosing space 38. Cam enclosing space 38 is provided with threads 40 that receive the threads 42 formed on closing plug 44. Closing plug 44 is inserted and removed from cam enclosing space 38 by means of a screwdriver applied to slot 46 formed in the forward face of closing plug 44. A retaining pin 48 is inserted through aligned openings 50, 52 formed, respectively, in lock pin housing 26 and closing plug 44 to render unauthorized removal of closing plug 44 from the lock pin housing 26 more difficult.

A camshaft 54 is constructed so as to terminate at its front end in cam enclosing space 38 and at its aft end in the hollow interior 43 of tumbler housing 20. The front end of camshaft 54 is provided with cam means 56 that has diametrically opposed cam lobes. The diametrically opposed cam lobes are arranged, when the cam shaft has been rotated to a predetermined position, to simultaneously engage the heads 58 of all the lock pins 60 and force them radially outward beyond the confines of lock pin housing 26 in opposition to coil springs 63, which, respectively, bear on heads 58 of lock pins 60 and tend to force them radially inwardly so that their outer ends will be located within the confines of the outer surface of lock pin housing 26.

The aft end of camshaft 54 that extends into the hollow interior 43 of tumbler housing 20 has secured thereto an eccentrically disposed camshaft operating arm 62. This eccentrically disposed camshaft operating arm 62 is so positioned that it may be rotated by a key-operated tumbler unit that is inserted within the interior 43 of tumbler housing 20 so that all of the lock pins 60 are simultaneously forced outwardly beyond the outer surface of lock pin housing 26 against the bias of their associated lock pin springs 63.

Plurality of lock housing 26 receiving or retaining receptacles, designated generally by the numeral 64, are inserted through openings formed in the instrument panel 66 which is usually formed of sheets of aluminum alloy of from 0.040 inch to 0.060 inch in thickness and extend through openings formed in trim panel 86 when a trim panel is provided by the aircraft manufacturer. The number of such lock housing receiving or retaining receptacles 64 corresponds in number and spacing to lock pin housings 26 provided on cover C.

Each of the lock housing 26 receiving receptacles 64 comprises a tubular member 68 which is circular in cross-section and provided with threads 70 on its exterior.

Mounted for axial movement on tubular member 68 forward of instrument panel 66 is a reinforcing spider-like element 72. Reinforcing element 72 has a central annular portion 74 and a plurality of radially extending reinforcing ribs 76 that are secured to annular portion 74 by welding as shown at 78. While the spider-like element 72 may be made from any well known material, it is preferred that its central portion 74 be made from aluminum tubing and its radially extending ribs 76 of flat aluminum stock welded to annular portion 74. Spider-like element 72 is secured in engagement with the forward surface of instrument panel 66 and against axial movement by a pair of jam nuts 80, 82 that are threaded on the threads 70 of tubular member 68 and are in engagement, respectively, with the aft face of instrument panel 66 and the forward end of central annular portion 74. The aft end 84 of tubular member 68 may be designed to extend beyond the confines of a plastic trim panel 86 when the aircraft is provided with a trim panel by the manufacturer.

The exact location of the lock housing receiving receptacle 64 on the instrument panel 66 will be determined in most instances by the location of the instruments on instrument panel 66. If an unused instrument mounting opening is available, the lock receptacle 64 may be mounted in an opening 88 formed in an aluminum filler plate 90 that is held secured within such unused instrument mounting opening in the instrument panel 66 by securing elements inserted through mounting holes 92, 94 provided, respectively, on the instrument panel 66 and filler plate 90. Each filler plate 90, which usually is made from aluminum, includes a flat portion 96 that engages the forward surface of instrument panel 66 and overlaps the instrument opening with which it is associated and a cylindrical portion 98 that enters into the instrument opening and has its lateral surface preferably in snug engagement with the peripheral edge of the instrument opening.

When it has been determined that a protective cover such as C or C' is to be provided for the navigational instruments and radio equipment which are mounted for removal and replacement from the aft face of the instrument panel of an aircraft, it is necessary that lock housing receiving or retaining housing 64, which includes a tubular member 68, be fixedly secured to the instrument panel 66 of the aircraft.

The number of such lock housing receiving or retaining receptacles 64 and their spacing on the panel of the aircraft corresponds in number and spacing to the key locking assemblies such as 14 provided on cover member C and C'.

The covers C or C' may be locked in place over the navigational instruments and radio equipment mounted on the instrument panel 66 of the aircraft by first applying a key to the key-operated tumbler unit (not illustrated) but located within the interior 43 of tumbler housing 20 and turning the same so as to operate the camshaft 54 to a position where the cam lobes are disposed so that the coil springs 63, bearing, respectively, on the heads 58 of the lock pins 60, are effective to move the lock pins 60 to where their outer ends are positioned within the confines of the outer surface of lock pin housing 26. With the lock pins disposed within the confines of the outer surface of lock pin housing 26, the cover member C orC' can be adjusted so that each of the camshaft and locking pin housings 26 will pass through a correspondingly positioned tubular member 68 of lock housing 26 receiving receptacle 64. The key for operating the key-operated tumbler unit may then be turned so that the camshaft operating arm 62, camshaft 54 and cam means 56 are rotated to a position where the cam lobes engage the heads 58 of all the lock pins 60 and force them radially outward beyond the peripheral surface of tubular member 68 against the bias of coil springs 63. With the ends of the lock pins 60 disposed beyond the outer peripheral surface of lock housing pin 26, the cover C or C' cannot be removed from its position covering the navigational instruments or radio equipment mounted on the instrument pane thereby preventing tampering or unauthorized removal of such instruments or equipment from the aircraft.

Although the detailed description of the invention sets forth that the navigational instruments and radio equipment of the aircraft are mounted on the instrument panel 66 of the aircraft, it should be apparent that such instrument panel may be a structural panel of the aircraft or merely a panel that serves solely as an instrument support.

After reading the foregoing detailed description, it will be apparent that the objects set forth initially have been successfully achieved. Accordingly,

What is claimed is:

1. In an aircraft including fixed aircraft structure such as an instrument panel provided with navigational instruments and other equipment mounted on said panel, cover means for such instruments and equipment which comprises an elongated concave cover that is constructed to enclose such instruments and equipment mounted thereon and lock means for securing said cover to said panel including at least one adjustable locking device mounted on said cover adapted to be adjusted to a predetermined position where said at least one adjustable locking device coacts with a fixed lock receptacle mounted on the structure of the aircraft to secure said cover to said panel and adjustable to other positions than said predetermined position where said locking device is ineffective to secure said cover to said panel; at least one said adjustable locking device includes a plurality of lock pins that are actuated from a spring biased unlocking position to a locking position in engagement with said fixed locking device by a cam means.

2. A cover means for an aircraft panel as defined in claim 1 wherein said cam means is actuated by a mechanical movement that is actuated by a key-operated tumbler located within a tumbler housing.

3. A cover means for an aircraft panel as defined in claim 1 wherein said lock means for securing said cover to said aircraft panel includes a plurality of spaced adjustable locking devices that coact, respectively, with a plurality of fixed lock receptacles housing and a key-operated tumbler secured within said tumbler housing and said adjustable locking devices each further include a plurality of lock pins that are actuated from a spring biased unlocking position to a locking position in engagement with said fixed locking device by a cam means.

4. A cover means for an aircraft panel as defined in claim 3 wherein said cam means is actuated by a mechanical movement that is actuated by a key-operated tumbler located within a tumbler located within a tumbler housing.

5. A cover means for an aircraft panel as defined in claim 1 wherein said cover is formed of a plastic resin in which is embedded inside and outside layers of woven fiber glass mesh and an in-between layer of steel wire screen.

6. A cover means for an aircraft panel as defined in claim 5 wherein the top and bottom edges of the cover are provided with circumferential flanges which fit within a recess in the instrument panel making prying off of said cover more difficult.

7. A cover means for an aircraft panel as defined in claim 9 wherein said plastic resin in the immediate area of the steel wire screen 11 is formed of only partially cured plastic 8. A cover means for an aircraft panel as defined in claim 6 wherein said cover is provided with longitudinally extending molded indentations which form strengthening ribs.

9. A cover means for an aircraft panel as defined in claim 1 wherein the fixed lock receptacle mounted on the structure of the aircraft comprises an externally threaded elongated tubular member which extends through an opening in the instrument panel of the aircraft and is secured to said panel by jam nuts that are threaded on said externally threaded tubular member on opposite sides of said panel.

10. A cover means for an aircraft panel as defined in claim 9 wherein said fixed lock receptacle includes a panel reinforcing element that bears on the forward face of said instrument panel.

11. A cover means for an aircraft as defined in claim 1 wherein said lock receptacle is secured in openings provided in plates that are, respectively, secured to the instrument panel of the aircraft and overlap unused instrument receiving openings formed in the instrument panel of said aircraft.

12. A cover means for an aircraft as defined in claim 11 wherein each of said plates is provided with a face portion that contacts the instrument panel and an axially extending portion that is of a dimension to completely contact the entire edge of an unused opening in the aircraft panel.

13. A cover means for an aircraft panel as defined in claim 1 wherein the lock means for securing said cover to said aircraft panel includes a plurality of spaced adjustable locking devices that coact, respectively, with a plurality of fixed lock receptacles; wherein each of said adjustable locking devices includes a tumbler housing having a key-operated tumbler secured within said housing a locking pin housing having a plurality of lock pins that are actuated from a spring biased unlocking position to a locking position in engagement with said fixed lock receptacle by a cam means which is actuated by a mechanical movement that is actuated by the key-operated tumbler; wherein said cover has top and bottom circumferential flanges that fit within a recess in the aircraft panel; wherein said cover is formed of a plastic resin in which is embedded inside and outside layers of woven fiber glass mesh and an in-between layer of steel wire screen; and wherein the plastic resin in the immediate area of the steel wire screen is only partially cured.

14. In an aircraft including fixed aircraft structure a cover means for the navigational instruments and other equipment mounted on the panel of the aircraft which comprises an elongated concave cover that is shaped to enclose said instruments and equipment mounted thereon and lock means for securing said cover to said panel including at least one adjustable locking device mounted on said cover adapted to be adjusted to a predetermined position where said locking device coacts with a fixed lock receptacle mounted on the structure of the aircraft to secure said cover to said panel and adjustable to other positions than said predetermined position where said locking element is ineffective to secure said cover to said panel; said fixed lock receptacle mounted on the structure of the aircraft includes an externally threaded elongated tubular member which extends through an opening in the instrument panel of the aircraft and is secured to said panel by jam nuts that are threaded on said externally threaded tubular member on opposite sides of said panel; said fixed lock receptacle includes a panel reinforcing element that bears on the forward face of said instrument panel and comprises a central annular portion and a plurality of radially extending ribs fixedly secured to said central annular portion; the aft edges of said central annular portion and aft edges of said radially extending ribs abut the forward face of said instrument panel.

15. In an aircraft including fixed aircraft structure, a cover means for the navigational and other instruments mounted on said panel of the aircraft which comprises an elongated concave cover that is shaped to enclose said instruments and equipment mounted thereon and lock means for securing said cover to said aircraft panel that includes a plurality of spaced locking devices that coact, respectively, with a plurality of fixed lock receptacles mounted on the structure of the aircraft; said lock receptacles each comprising an externally threaded elongated tubular member which extends through an opening in the instrument panel of the aircraft and is secured to said panel by jam nuts that are threaded on said externally threaded tubular member on opposite sides of said panel; and a panel reinforcing element comprising a central annular portion and a plurality of radially extending ribs fixedly secured to said central annular portion having aft edges that abut the forward face of the instrument panel.

16. A cover means for an aircraft panel as defined in claim 15 wherein the lock means for securing said cover to said aircraft panel includes a plurality of spaced adjustable locking devices that coact, respectively, with a plurality of fixed lock receptacles; wherein each of said adjustable locking devices includes a tumbler housing having a key-operated tumbler secured within said housing, a locking pin housing having a plurality of lock pins that are actuated from a spring biased unlocking position to a locking position in engagement with a fixed lock receptacle by a cam means that is actuated by a mechanical movement that is actuated by the key-operated tumbler; wherein said cover has top and bottom circumferential flanges that fit within a recess in the aircraft panel; wherein said cover is formed of a plastic resin in which is embedded inside and outside layers of woven fiber glass mesh and an in-between layer of steel wire screen; and wherein the plastic resin in the immediate area of the steel wire screen is only partially cured.

* * * * *